US006505470B1

United States Patent
Drube et al.

(10) Patent No.: US 6,505,470 B1
(45) Date of Patent: Jan. 14, 2003

(54) SYSTEM FOR DETECTING OVERFLOW OF A TANK

(75) Inventors: Thomas K. Drube, Lakeville, MN (US); Claus Emmer, Prior Lake, MN (US); Brian Bostrom, Minneapolis, MN (US)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 10/085,315

(22) Filed: Feb. 28, 2002

(51) Int. Cl.⁷ ............................................... F17C 13/02
(52) U.S. Cl. ....................................................... 62/49.2
(58) Field of Search ................................ 62/45.1, 49.1, 62/49.2

(56) References Cited

U.S. PATENT DOCUMENTS

| | | |
|---|---|---|
| 333,403 A | 12/1885 | Fitts |
| 1,288,578 A | 12/1918 | Hatfield et al. |
| 1,628,698 A | 5/1927 | Walker |
| 2,928,410 A | 3/1960 | Del Vecchio |
| 3,774,628 A | 11/1973 | Norton et al. |
| 3,904,175 A | 9/1975 | Deschenes |
| 3,938,347 A * | 2/1976 | Riedel et al. .................. 62/55 |
| 4,171,004 A | 10/1979 | Cerrato et al. |
| 4,171,708 A | 10/1979 | Pareja |
| 4,244,388 A | 1/1981 | Feiss |
| 5,842,347 A * | 12/1998 | Kinder ........................ 62/49.2 |
| 6,229,448 B1 * | 5/2001 | Bennet, Jr. et al. ......... 340/618 |
| 6,382,235 B1 | 5/2002 | Drube et al. |

OTHER PUBLICATIONS

Compressed Gas Association, "Protection of Cryogenic Storage Tanks from Overpressure During Operator-Attended Refill", 1997, pp. 1–4.
Compressed Gas Association, Incident Reporting Quarterly, vol. 1, Issue 3, Apr. 1, 1999, pp. 1–2.
MG Industries, "Bulk Nitrogen Tank Failure and Fatality", 1997, pp. 8–2 thru 8–12.
Industrial Gases Counsil, "Prevention of Excessive Pressure In Cryogenic Tanks During Filling" Sep. 8, 1997, pp. 2–12.
Bestobell Valves, "Automatic Shut Off Valve", 19?, pp. 1–4.

* cited by examiner

Primary Examiner—William C. Doerrler
Assistant Examiner—Malik N. Drake
(74) Attorney, Agent, or Firm—Piper Rudnick

(57) ABSTRACT

In a system for detecting overflow of a liquid cryogen storage tank, a differential pressure gauge measures the pressure of the tank at the top and bottom of the tank while liquid cryogen is introduced into the tank. Once the measurement reaches a predetermined amount, the operator terminates the fill. Alternatively, the differential pressure gauge sends a signal to the controller and the controller shuts the valves off. The tank includes an outlet pipe connected to either an audible device or avisual device and a vent stack. The excess cryogen, liquid or vapor, flows out of the tank through the outlet pipe. The audible device whistles when vapor passes through but is silent when the liquid passes through the audible device. This audible device provides a back-up warning which signifies when liquid cryogen is flowing out of the tank so that the operator may shut off the valves.

19 Claims, 2 Drawing Sheets

SYSTEM FOR DETECTING OVERFLOW OF A TANK

TECHNICAL FIELD OF THE INVENTION

The invention relates generally to systems for storing liquid cryogens, and, more particularly, to a system for detecting overflow of a liquid cryogen storage tank.

BACKGROUND OF THE INVENTION

Liquid cryogen storage tanks are typically found at hospitals, factories, and other facilities that feature cryogenic use devices. A typical cryogen storage tank features double wall construction with input valves. To refill such a tank, truck transporting a liquid cryogen (such as nitrogen, hydrogen or liquid natural gas) is connected to the input valves of the storage tank. The storage tank is then refilled with the liquid cryogen from the transport truck. It is necessary to monitor the level of liquid cryogen while refilling the tank to prevent an overflow which would result in a lack of vapor space in the tank. A vapor space, i.e. head space, is necessary to provide room for liquid expansion as the tank absorbs heat.

Normally, a "Trycock" system is used to detect the refill level in the storage tanks. The Trycock system consists of a dip tube positioned in the top part of the tank. The tube extends from inside the head space of the tank to the outside of the tank by way of a pipe. If liquid raises to the level of the dip-tube, it will flow through the tube and exit thereby indicating the liquid level is at the dip-tube.

Flammable gases, such as hydrogen or liquid natural gas (LNG), exiting the tank must be directed to a vent stack that directs the gas to a safe area for discharge. It is harmful to the environment to discharge the cryogen directly to the atmosphere. Thus, there exists a need for a device that can indicate the presence of liquid in the exit pipe or the vent stack.

The prior art discloses systems with devices that measure the level of liquid cryogen in a tank to determine when the tank is full. These systems, however, suffer from disadvantages. An example is a system having a pipe that places the head space of the tank in communication with a vent stack outside of the tank. The vent stack is a vertical pipe that is open at the top and requires liquid cryogen to travel against the force of gravity before exiting the stack. This system prolongs the time it takes for the liquid cryogen to enter the atmosphere. As such, liquid is permitted to flow to the stack and the stack is monitored for visual signs of liquid entering the stack such as condensation appearing on the stack or the presence of liquid at the top of the stack.

The liquid cryogen will continue to flow through the pipe and up the vent stack until the input valve is manually closed by the operator. If there is no obvious signal, the operator might not be aware that liquid cryogen has started to flow through the pipe. The operator must constantly monitor the stack for condensation or the presence of liquid. The problem with this method of detecting is that an operator may not be constantly watching the stack to see the condensation or liquid and might not be able to shut off the valve in a timely manner.

A modified version of the above system includes a gas thermometer in communication with the pipe. This system requires the gas thermometer to be charged with a gas that responds to the presence of liquid in the pipe. Gas thermometers charged with neon or hydrogen have proven successful, but sometimes encounter difficulties when exposed to LNG temperatures. This system is also not a fail safe method if the thermometer is not continuously monitored by the operator. Failure to timely notice the change in temperature that signifies the change in phase (gas to liquid) traveling through the pipe can lead to overfilling the tank.

Another system used to detect overflow has a tube in the head space of the tank that extends outside of the tank and uses optical sensors, i.e. light beams. The light beam passes through the pipe. Once the liquid cryogen begins to travel through the pipe the light beam is interrupted. This system is not ideal because it is expensive and the signal still must be continuously watched by the operator. By the time the operator is aware of the signal, it is often too late and the tank has been over filled.

Accordingly, it is an object of the present invention to provide a device to alert an operator that the storage tank has reached a predetermined fill level of liquid cryogen.

It is another object of the present invention to provide a device to detect overflow in a liquid cryogen tank that is economical, simple and does not require constant operator attention.

It is another object of the present invention to provide a device to detect overflow in a liquid cryogen tank that is easy to install in existing storage systems.

SUMMARY OF THE INVENTION

The present invention is directed to a system for storing cryogenic fluid. The cryogenic fluid is stored in an insulated tank that includes an input line for receiving cryogenic fluid and a head space for storing cryogenic vapor. The inlet line is in communication with a valve that receives the liquid cryogen from a delivery truck. An outlet pipe is in communication with the head space of the tank. A device for detecting overflow of the tank is in communication with the outlet pipe. The device produces an audible signal responsive to a change in state of the cryogenic fluid passing through the outlet pipe.

In another aspect of this invention, the overflow detecting device includes a housing that defines an interior chamber with a tab secured over an opening in the housing. The device is connected to the outlet pipe of the tank. The device produces an audible signal when cryogenic vapor passes through the outlet pipe, but no signal when liquid cryogen passes through the outlet pipe.

Alternatively or additionally, a visual back-up device may be used with the present system. A closed loop pipe can be.;connected to the outlet pipe so that when liquid cryogen flows through the closed loop pipe, a frost develops on the pipe signifying to the operator that liquid cryogen has left the tank and the input valve needs to be closed.

The following detailed description of embodiments of the invention, taken in conjunction with the appended claims and accompanying drawings, provide a more complete understanding of the nature and scope of the invention.

DESCRIPTION OF THE PREFERRED EMBODIMENT

Figure 1:
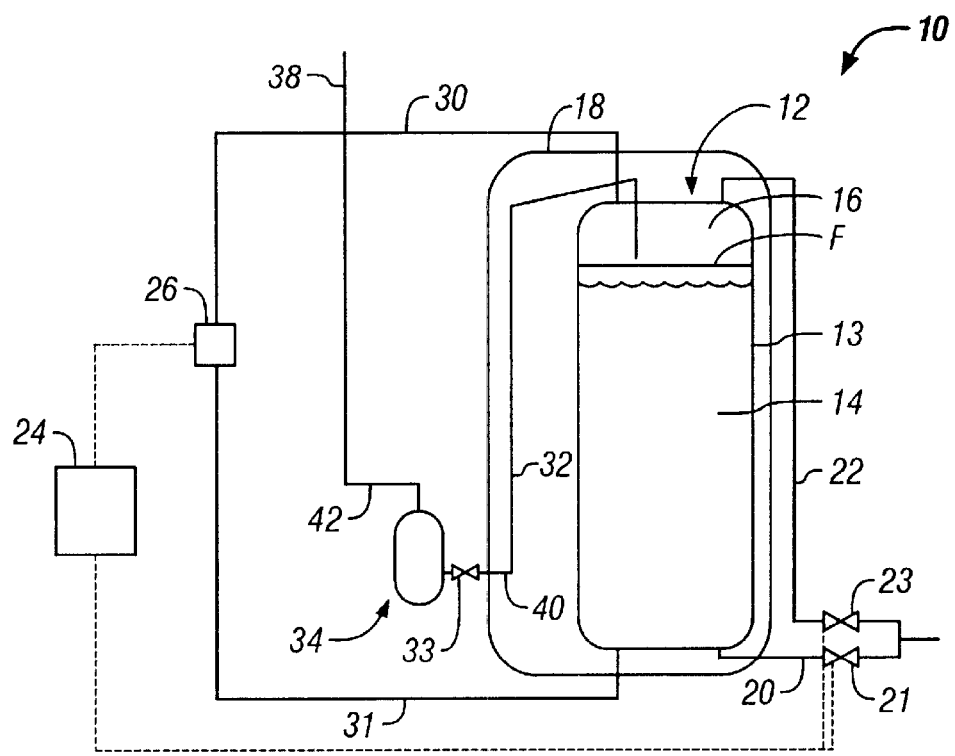
FIG. 1 is a schematic diagram of a liquid cryogen storage tank equipped with an embodiment of the system of the present invention.

With reference to FIG. 1, a liquid cryogen storage system constructed in accordance with the present invention is indicated in general at 10. The storage system 10 includes a tank 12 that holds liquid cryogen 14. Examples of cryogenic liquids capable of being stored by this tank are nitrogen, carbon dioxide and liquefied natural gas. The tank 12 includes a chamber 13 with a head space 16 that is occupied by cryogenic vapor. The chamber 13 has a predetermined fill level F for the cryogenic fluid. The tank 12 is surrounded by an insulating jacket 18. In the illustrated embodiment, the jacket 18 is air tight and a vacuum between the jacket 18 and the tank 12 insulates the tank 12.

The tank 12 includes an inlet line 20 connected to a port at the bottom of the tank 12 by means of a valve 21 located outside of the tank 12. The tank 12 also includes a vapor return line 22 connecting a port at the top of the tank to a valve 23 located outside of the tank 12. The valve 21 is configured to receive liquid cryogen from a delivery truck while valve 23 is configured to return cryogenic vapor to the delivery truck. Liquid cryogen flows from the delivery truck through the inlet line 20 into the bottom of the tank 12. Vapor return line 22 permits a portion of the cryogenic vapor to return to the delivery truck. Preferably, the valves 21, 23 are connected by signal lines (shown in dashed line) to, and actuated by, a controller 24. Suitable controllers are available from the Allen Bradley company. The controller 24 monitors the operation of the valves 21, 23 and the amount of liquid cryogen 14 in the tank 12.

The tank 12 also includes a differential pressure gauge 26. The differential pressure gauge 26 provides the primary means of the controller 24 in detecting the level of the liquid cryogen 14 in the tank 12. The differential pressure gauge 26 is connected via sense lines 30 and 31, respectively, to the head space 16 and bottom portion of the tank 12. The differential pressure gauge 26 measures the pressure of the liquid cryogen at the bottom portion of the tank 12 and the pressure of the cryogenic vapor in the head space 16 of the tank 12. The differential pressure from gauge 26 is supplied to the controller 24 so that the controller 24 can monitor the level of liquid cryogen in the tank 12.

As the liquid cryogen 14 flows into the tank 12, the pressure at the bottom of the tank 12 begins to increase. Once the pressure differential reaches a predetermined amount, the differential pressure gauge 26 will indicate to the operator, and/or send a signal to the controller 24, to shut off the valves 21, 23.

The storage system 10 also includes a "Trycock" system including an outlet pipe 32 inserted at the top of the tank 12 to communicate with the head space 16. Outside of the jacket 18, the outlet pipe 32 is connected to a manual valve 33, an audible device 34 and a vent stack 38. The manual valve 33 allows the operator to close the outlet pipe 32 to prevent the cryogen from leaving the tank 12. The audible device 34 is a fill level indicator that provides a back up signal for detecting overflow of liquid cryogen in the tank 16 if the differential pressure gauge 26 or controller 24 fails.

Figure 2:
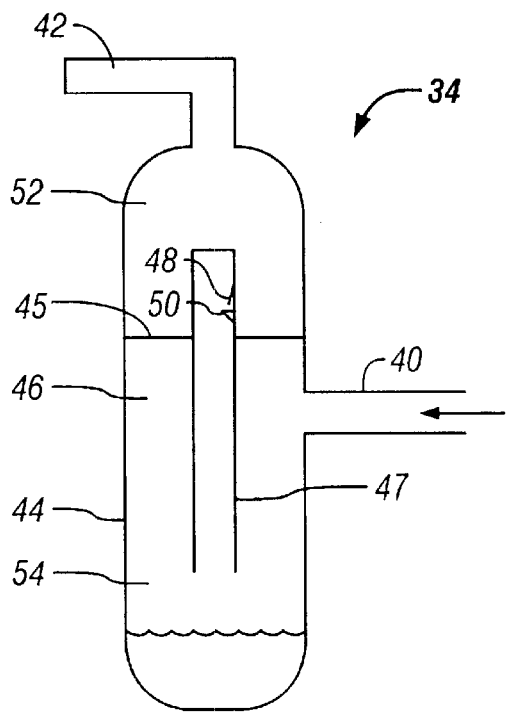
FIG. 2 is an enlarged sectional view of the back-up signal device of the system of FIG. 1.

FIG. 2 illustrates the details of the audible device, indicated in general at 34, suitable for use in the present invention. The audible device 34 includes an input conduit 40 and an output conduit 42. The input conduit 40 connects to the outlet pipe 32 (FIG. 1) by welding, clamping or other connectors known in the art. The output conduit 42 is connected to vent stack 38 (FIG. 1) in a similar fashion. The audible device 34 also includes a housing 44 defining an interior chamber 46. In general, the chamber 46 of the audible device 34 includes a small restrictive opening. The interior chamber 46 is preferably divided into an upper portion 52 and a lower portion 54 by a sealing, horizontally dispersed interior partition such as a disk 45. An aperture is formed in the center of the disk 45. A tube 47 is positioned in the aperture of the disk 45 so as to be supported within the chamber 46. The tube 47 includes a tab or reed 48 secured to the tube 47. As shown in FIG. 2, the tab 48 extends into the interior surface of the tube 47. The tube 47 also includes an opening 50 located below the tab 48. As an alternative to tab 48, the audible device 34 may use a ball positioned within tube 47 to produce a whistle sound. Other wind actuated sounding devices known in the art may be substituted for audible device 34. These include, but are not limited to, a pipe of the kind found in a pipe organ, a police whistle or a tea kettle whistle.

During refill, as the tank 12 fills with the liquid cryogen 14, the head space 16 contracts and cryogenic vapor therefrom is fed through outlet pipe 32. The cryogenic vapor flows through the outlet pipe 32, passing through the audible device 34, up the vent stack 38 and out into the atmosphere. Vapor flowing through the outlet pipe 32 enters the lower portion 54 of the interior chamber 46 of the audible device 34. As a result, the pressure within the lower portion 54 builds. The tab 48 directs the cryogenic vapor to the outer edges of the opening 50 causing the flowing gas to oscillate. The oscillating gas produces an audible signal, i.e. a whistle. The whistle alerts the operator that cryogenic vapor is exiting the system 10. Since the flow of the vapor is constant, once the vapor begins to flow through the audible device 34 the whistle will continue until the vapor flow is no longer present. Additionally, the inlet to the audible device is higher than the lowest part of the chamber. This separates intermittent two phase flow and prevents an early full indication.

If the tank 12 becomes full of liquid and either the differential pressure gauge 26 fails to send a shut down signal to controller 24 or the controller 24 fails to shut off the valves 21, 23, excess liquid cryogen 14 will begin to leave the tank 12 via the outlet pipe 32. Once the liquid cryogen 14 reaches the opening 50 of the audible device 34 the whistle sound stops. When the whistle stops, the operator is alerted that liquid cryogen 14 is flowing through the outlet pipe 32 and that the valves 21, 23 should be manually closed. Thus, the audible device 34 provides a back-up warning for the system 10 in the event of differential pressure gauge 26 and/or controller 24 failure. Alternatively, the audible device 34 can be used as the primary overflow indicator of the liquid cryogen storage system.

Figure 3:
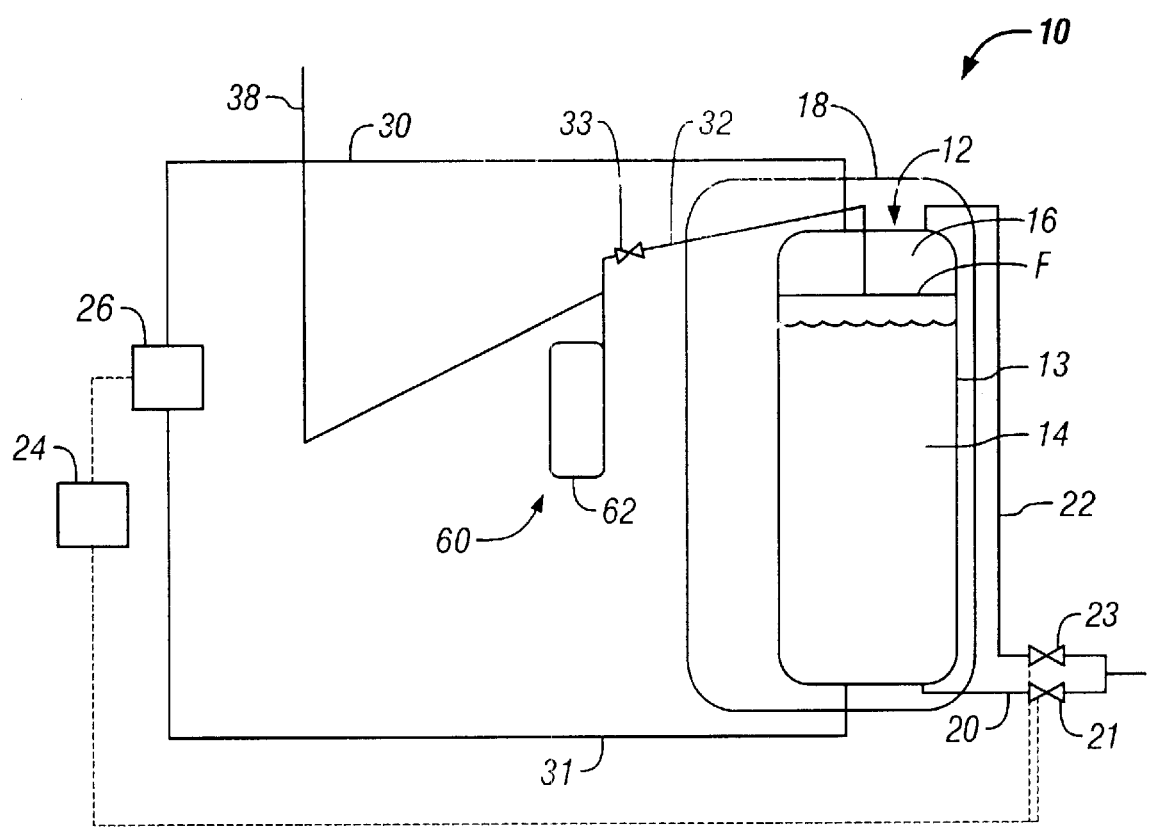
FIG. 3 is a schematic diagram of a liquid cryogen storage tank equipped with an alternative embodiment of the system of FIG. 1

FIG. 3 illustrates visual device 60, which may be used as an alternative or additional back-up device, with the liquid cryogen storage system of the present invention. The outlet pipe 32 of the "Trycock" system extends from the head space 16 at the top of tank 12 to outside the tank 12 and jacket 18 where it is connected to the visual device 60. The outlet pipe 32 is also connected to vent stack 38. Visual device 60 includes a closed loop pipe 62, which is rectangular but can be formed from other shapes. The closed loop pipe 62 is formed from stainless steel. The closed loop pipe 62 is positioned below the inlet to pipe 32 which is located in the head space 16. The closed loop pipe 62 collects excess cryogenic vapor as it flows out of the tank 12 through the outlet pipe.32. When liquid cryogen 14 exits the tank 12, the liquid cryogen 14 displaces the cryogenic vapor located in the closed loop pipe 62 such that the liquid cryogen 14 starts to accumulate in the closed loop pipe 62. As the liquid cryogen 14 fills the closed loop pipe 62, the temperature of the pipe decreases. As a result, water vapor from the air condenses on the outer surface of the closed loop pipe 62 thereby developing a frost on the outer surface of the closed loop pipe 62. The frost build up on the closed loop pipe 62 alerts the operator that liquid cryogen is flowing out of the storage tank 12 through the outlet pipe 32 and that valves 21, 23 should be manually closed. Since this indicator depends on frost formation, i.e., condensation of water vapor from the surrounding atmosphere, it is important that the closed loop pipe 62 be exposed to the ambient atmosphere or some other water vapor containing gas having a temperature substantially greater than the dew point at which the condensation begins to form.

Thus, visual device 60 provides an alternative back-up device for the system 10 in the event of differential pressure gauge 26 and/or controller 24 failure. In addition, visual device 60 also prolongs the time it takes for liquid cryogen to enter the atmosphere. If desired, the visual device can be used as the primary overflow indicator of the system.

While the preferred embodiment of this invention has been shown and described, it will be apparent to those skilled in the art that changes and modifications may be made therein without departing from the spirit of the invention, the scope of which is defined by the appended claims.

What is claimed is:

1. A system for storing a cryogenic fluid comprising:
    a. an insulated tank adapted to hold the cryogenic fluid, the tank including a head space adapted to contain cryogenic vapor therein and an input port for receiving liquid cryogen;
    b. an input pipe including a valve adapted to receive liquid cryogen from a delivery vehicle;
    c. an outlet pipe in communication with the head space of the tank; and
    d. a device in communication with the outlet pipe producing a change in an audible signal responsive to a change in the state of the cryogenic fluid passing through the outlet pipe.

2. The system of claim 1, wherein the tank includes a differential pressure gauge providing a primary device for detecting liquid cryogen in the tank and a controller to monitor and stop the filling of liquid cryogen in the tank.

3. The system of claim 1, wherein the device produces the audible signal when cryogenic vapor passes through the outlet pipe but no signal when liquid cryogen passes through the outlet pipe.

4. The system of claim 1, wherein the device includes a housing defining an interior chamber, a tab secured over an opening in the housing for producing the audible signal, and means for connecting the device to the outlet pipe.

5. The system of claim 4, wherein the inlet to the device is higher than the bottom of the interior chamber of the device.

6. The system of claim 4, wherein the audible signal is caused by a whistle.

7. A device for detecting overflow of liquid cryogen from an insulated tank with an input pipe including a valve and an outlet pipe, the device comprising:
    a. a housing defining an interior chamber;
    b. a tab secured over an opening in the housing for producing an audible signal; and
    c. means for connecting the device to the outlet pipe, whereby the device produces the audible signal when cryogenic vapor passes through the outlet pipe, but no signal when liquid cryogen passes through the outlet pipe.

8. The device of claim 7, wherein the inlet to the device is higher than the bottom of the interior chamber of the device.

9. The device of claim 7, wherein said device is a whistle.

10. A method for filling a storage tank with cryogen having a predetermined fill level and a head space above the fill level, comprising the steps of:
    introducing liquid cryogen into an inlet port of the tank through an input line having a valve;
    filling the tank so that a level of liquid cryogen in the tank approaches the predetermined fill level; and
    emitting an audible signal as the liquid cryogen rises in the tanks; and
    ceasing to produce an audible signal upon the level of liquid cryogen exceeding the predetermined fill level.

11. The method of claim 10, further comprising producing the audible signal when cryogenic vapor flows through an outlet pipe that is in communication with the head space in the tank.

12. The method of claim 11, further comprising ceasing to produce the audible signal when liquid cryogen flows through the output pipe.

13. The method of claim 10, further comprising closing the valve that introduces the liquid cryogen into the inlet port of the tank.

14. A cryogenic fluid tank comprising:
    a chamber, an upper portion of the chamber serving as a head space, the chamber having a predetermined fill level;
    an inlet port for the introduction of liquid cryogen into the tank; and
    a fill level indicator providing an audible signal indicative of a level of the liquid cryogen exceeding the predetermined fill level.

15. The tank of claim 14, wherein the fill level indicator produces the audible signal when cryogenic vapor passes through the outlet pipe but no signal when liquid cryogen passes through the outlet pipe.

16. The tank of claim 14, wherein the fill level indicator includes a housing defining an interior chamber; a tab secured over an opening in the housing for producing the audible signal, and means for connecting the device to the outlet pipe.

17. The tank of claim 14, wherein the inlet to the fill level indicator is higher than the bottom of the interior chamber of the indicator.

18. The tank of claim 14, wherein the audible signal is made by a whistle.

19. A cryogenic fluid tank insulated by a jacket, comprising:
    a chamber and having a predetermined fill level between lower and upper portions of the chamber, an inlet port opening in the chamber for the introduction of liquid cryogen; and
    a closed loop indicator pipe disposed exteriorly of the jacket housing and having an outer surface exposed to air, thermal conductivity of a sidewall of the indicator pipe preselected such that the presence of liquid cryogen in the indicator pipe will cause water vapor from the air to condense on the outer surface of the closed loop pipe thereby providing a visual indication of overfill of the chamber.

* * * * *